Patented Dec. 19, 1950

2,534,332

UNITED STATES PATENT OFFICE 2,534,332

2-OXOIMIDAZOLINES AND PROCESS FOR PREPARING THE SAME

David W. Woodward, Wilmington, Del., assignor to E. I. du Pont de Nemours and Company, Wilmington, Del., a corporation of Delaware No Drawing. Application September 15, 1949, Serial No. 115,951

11 Claims. (Cl. 260—309)

This invention relates to new nitrogen-containing heterocyclic compounds and method of producing the same from hydrogen cyanide tetramer.

Hydrogen cyanide tetramer, a crystalline material having the empirical formula $C_4H_4N_4$, has been known for some time (Roczniki Chem. 8, 165 (1928); J. Chem. Soc. 1937, 1432). The structure of this compound is not known with absolute certainty, but, on the basis of its chemical reactions, it is believed to be either (1) 1,2-dicyano-1,2-diaminoethylene (i. e., diaminomaleonitrile), or (2) 1,2-dicyano-1-amino-2-iminoethane (i. e., aminoiminosuccinonitrile), or an equilibrium mixture of the two forms.

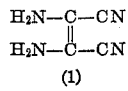

(1)

or

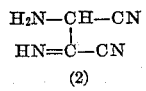

(2)

Structure (1) is favored on the basis of ultraviolet light absorption data.

An improved method for converting hydrogen cyanide to its tetramer has recently been described in my copending patent application, Serial No. 10,567, filed February 24, 1948, now U. S. Patent 2,499,441. This method comprises continuously passing liquid hydrogen cyanide at a temperature of 0° to 100° C. into contact with a water-insoluble basic-reacting solid catalyst, e. g., alumina, and rapidly removing the tetramer as it is formed from the catalyst. In this way, essentially quantitative yields are obtained.

It is an object of this invention to produce new nitrogen-containing heterocyclic compounds.

It is another object of this invention to provide new and improved processes for the production of nitrogen-containing heterocyclic compounds.

It is a specific object of this invention to produce 2-oxo-4,5-imidazolinedicarbonitrile and the alkali metal salts thereof.

It is another specific object of this invention to produce 2-oxo-4,5-imidazolinedicarbonamide and the alkali metal salts thereof.

It is a further object of this invention to provide new and improved processes for the production of 2-oxo-4,5-imidazolinedicarbonitrile, 2-oxo-4,5-imidazolinedicarbonamide and the alkali metal salts thereof.

Other objects of the invention will appear hereinafter.

The objects of this invention may be accomplished, in general, by reacting hydrogen cyanide tetramer with phosgene in the presence of a hydrogen chloride acceptor. The dicarbonitrile prepared in this manner may be converted to the corresponding dicarbonamide by hydrolysis.

The reaction between hydrogen cyanide tetramer and phosgene is illustrated by the following equation.

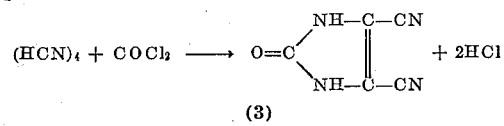

(3)

2-oxo-4,5-imidazolinedicarbonitrile is indicated above as having structure (3), but it may exist partly or wholly in the following isomeric structure.

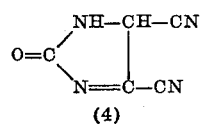

(4)

The chemical name "2-oxo-4,5-imidazolinedicarbonitrile" is applicable to both structures.

A convenient method for preparing 2-oxo-4,5-imidazolinedicarbonitrile consists in dissolving hydrogen cyanide tetramer in aqueous solution containing a hydrogen chloride acceptor and passing in phosgene. The reaction takes place readily at ordinary temperatures. The reaction is preferably carried out until a slight excess over theoretical amount of phosgene has been added. The method for the isolation of the 2-oxo-4,5-imidazolinedicarbonitrile varies somewhat depending upon the particular hydrogen chloride acceptor used. When calcium carbonate is used, the reaction mixture is concentrated by evaporation, preferably under vacuum, cooled, and the crystals which form separated by filtration. Purification of the crude 2-oxo-4,5-imidazolinedicarbonitrile is accomplished by recrystallization from water or other solvent. If sodium hydroxide is used as the hydrogen chloride acceptor and the pH is allowed to reach 8.0 or higher, 2-oxo-4,5-imidazolinedicarbonitrile is obtained in the form of its monosodium salt. Treatment of the sodium salt with acid liberates the free dicarbonitrile which can be purified by crystallization from water or other solvent.

2 - oxo - 4,5 - imidazolinedicarbonitrile, or 4,5 - imidazolonedicarbonitrile, as it may also be called, is a white crystalline solid that melts with decomposition at 270° C. It is soluble in water, alcohol and dioxane; slightly soluble in ether and benzene; and essentially insoluble in saturated hydrocarbons. It forms alkali metal salts on treatment with alkali metal (e. g., sodium or potassium) hydroxides or alkali metal salts of weak acids, such as carbonic acid, at pH's above about 8.0.

Hydrolysis with either acid, preferably sulfuric acid, or alkali under controlled conditions will convert the 2-oxo-4,5-imidazolinedicarbonitrile to the corresponding diamide, namely, 2-oxo-4,5-imidazolinedicarbonamide. This diamide is also a white crystalline solid. It does not melt but sublimes above 300° C. It is insoluble in water and in common organic solvents but forms water-soluble alkali metal salts when treated with alkali metal hydroxides or alkali metal salts of weak acids at pH's above about 8.0.

The following examples illustrate, in detail, certain preferred methods for the production of the above-mentioned new compounds. It is to be understood that the details of the examples are illustrative and are not to be taken as limitative of the invention.

*Example I*

A solution of 5 parts of hydrogen cyanide tetramer in a mixture of 50 parts of water and 50 parts of dioxane is stirred at 10° C. while adding simultaneously gaseous phosgene and a solution of 10 parts of sodium hydroxide in 50 parts of water. The sodium hydroxide is added at such a rate that the pH of the reaction mixture is kept at about 6.0 to 9.0. After all the alkali is added, the addition of phosgene is discontinued when the pH reaches about 8.0. The mixture is warmed to 50° C., filtered and cooled to 0° C., whereupon a white solid crystallizes. This solid is removed by filtration and dried. There is thus obtained 4 parts of a pale yellow crystalline solid which, on recrystallization from 80% alcohol, yields the sodium salt of 2-oxo-4,5-imidazolinedicarbonitrile in the form of a white crystalline solid.

Chemical analysis of the white crystalline solid for nitrogen and sodium, and comparison with the calculated percentages of nitrogen and sodium in the sodium salt of 2-oxo-4,5-imidazolinedicarbonitrile, $C_5HON_4Na \cdot 2H_2O$, gave the following results:

|  | Nitrogen | Sodium |
|---|---|---|
|  | Per cent | Per cent |
| Calculated for $C_5HON_4Na \cdot 2H_2O$ | 29.2 | 12.0 |
| Found by analysis | 29.0 and 28.9 | 12.4 |

Three (3) parts of the above sodium salt is dissolved in 20 parts of absolute alcohol and treated with 1 part of concentrated sulfuric acid in 20 parts of absolute alcohol. Sodium sulfate precipitates and is removed by filtration. The filtrate is evaporated to dryness, and the residue is recrystallized from dioxane. This yields two parts of 2-oxo-4,5-imidazolinedicarbonitrile in the form of white crystalline needles that melt with decomposition at 270° C.

Chemical analysis of the white crystalline needles for carbon, hydrogen and nitrogen, and comparison with the calculated percentages of carbon, hydrogen and nitrogen in 2-oxo-4,5-imidazolinedicarbonitrile, $C_5H_2ON_4$, gave the following results:

|  | Carbon | Hydrogen | Nitrogen |
|---|---|---|---|
|  | Per cent | Per cent | Per cent |
| Calculated for $C_5H_2ON_4$ | 44.78 | 1.49 | 41.80 |
| Found by analysis (Avg.) | 44.83 | 1.65 | 40.78 |

*Example II*

To a solution of 20 parts of hydrogen cyanide tetramer in a mixture of 150 parts of water and 150 parts of dioxane is added 30 parts of calcium carbonate. The mixture is stirred at 5° C. and phosgene is passed in at 5° C. until the pH of the mixture falls below 5.0. The mixture is then concentrated to about one-fourth of its original volume on a steam bath under vacuum, cooled to 0° C., and filtered. The resulting white solid is recrystallized from 50 parts of water to yield 20 parts of 2-oxo-4,5-imidazolinedicarbonitrile, M. P. (dec.) 270° C.

Chemical analysis of the white solid for carbon, hydrogen and nitrogen, and comparison with the calculated percentages of carbon, hydrogen and nitrogen in 2-oxo-4,5-imidazolinedicarbonitrile, $C_5H_2ON_4$, gave the following results:

|  | Carbon | Hydrogen | Nitrogen |
|---|---|---|---|
|  | Percent | Percent | Percent |
| Calculated for $C_5H_2ON_4$ | 44.78 | 1.49 | 41.80 |
| Found by analysis (Avg.) | 44.76 | 1.53 | 42.43 |

The 2-oxo-4,5-imidazolinedicarbonitrile is converted into the corresponding diamide as follows: Five (5) parts of the dicarbonitrile is dissolved in 10 parts of concentrated sulfuric acid and allowed to stand for 20 hours. The solution is then poured into 100 parts of ice and water. A white solid precipitates and is removed by filtration. The separated solid is slurried in 200 parts of boiling water and just enough sodium carbonate is added to bring about solution. The solution is clarified with activated charcoal and acidified with 5 parts of hydrochloric acid. The white solid that separates is removed by filtration. On drying, 4.5 parts of 2-oxo-4,5-imidazolinedicarbonamide is obtained as a white crystalline solid.

Chemical analysis of the white crystalline solid for carbon, hydrogen and nitrogen, and comparison with the calculated percentages of carbon, hydrogen and nitrogen in 2-oxo-4,5-imidazolinedicarbonamide, $C_5H_6O_3N_4$, gave the following results:

|  | Carbon | Hydrogen | Nitrogen |
|---|---|---|---|
|  | Per cent | Per cent | Per cent |
| Calculated for $C_5H_6O_3N_4$ | 35.30 | 3.53 | 32.94 |
| Found by analysis (Avg.) | 35.10 | 3.60 | 32.86 |

The foregoing examples illustrate the use of sodium hydroxide and calcium carbonate as acid or hydrogen halide acceptors. Other suitable hydrogen halide acceptors are sodium carbonate, sodium bicarbonate, potassium hydroxide, potassium carbonate, pyridine, quinoline, triethylamine, and tributylamine. In fact, any compound capable of combining with hydrogen chloride under the conditions of the reaction can be used as an acid acceptor. Sufficient hydrogen chloride acceptor should be added to the reactants to react with more than half the hydrogen chloride liberated. To obtain optimum results, sufficient hydrogen chloride acceptor should be added to react with all of the hydrogen chloride liberated. This means two equivalents of hydrogen halide acceptor per equivalent of phosgene used, since each molecule of phosgene yields two molecules of hydrogen chloride. By means of the acid acceptor, the pH of the reaction mixture is kept between 3.0 and 12.0, preferably within the range of from 6.0 to 8.0.

The reaction can be carried out in any solvent for the hydrogen cyanide tetramer that is less reactive to phosgene than is the hydrogen cyanide tetramer itself. Examples of such solvents are water, dioxane, glycol dimethyl ether, and acetonitrile. It is preferable to use solvents containing some water.

The reaction between hydrogen cyanide tetramer and phosgene can also be carried out by suspending the tetramer in finely divided form in an inert liquid diluent, for example, saturated hydrocarbons, ethers or benzene, and also containing a hydrogen chloride acceptor, and passing phosgene into the suspension.

As already indicated, the reaction takes place at ordinary temperatures, e. g., 0° C. to 50° C. It is desirable to operate in the range of 5° C. to 20° C. with aqueous systems, but temperatures outside this range are operable, e. g., 0° C. to 80° C., particularly in non-aqueous solvents.

2-oxo-4,5-imidazolinedicarbonitrile and its amide, i. e., 2-oxo-4,5-imidazolinedicarbonamide, are useful in the preparation of resins. Thus, on treatment with formaldehyde they yield methylol compounds which, on baking with an acid catalyst, e. g., maleic anhydride, yield clear, colorless, water-insoluble resins that are useful as textile crease- and shrink-proofing agents. Reaction of the dicarbonitrile with alkali hypohalites by the Hoffmann reaction yields uric acid, which is of value as a pharmaceutical intermediate. 2-oxo-4,5-imidazolinedicarbonitrile and its salts can also be used as intermediates in the preparation of dyes, textile treating agents, and surface-active agents.

Reference in the specification and claims to parts, proportions or percentages, unless otherwise specified, refers to parts, proportions or percentages by weight.

Since it is obvious that many changes and modifications can be made in the above-described details without departing from the nature and spirit of the invention, it is to be understood that the invention is not to be limited to said details except as set forth in the appended claims.

I claim:

1. The process for the production of nitrogen-containing heterocyclic compounds which comprises reacting phosgene with hydrogen cyanide tetramer in the presence of a hydrogen chloride acceptor, said reaction mass having a pH of between 3.0 and 12.0.

2. The process for the production of nitrogen-containing heterocyclic compounds which comprises reacting phosgene with hydrogen cyanide tetramer in the presence of a hydrogen chloride acceptor, said reaction mass having a pH of between 3.0 and 12.0, and hydrolyzing the resulting reaction product.

3. The process for the production of nitrogen-containing heterocyclic compounds which comprises reacting phosgene with hydrogen cyanide tetramer in the presence of a hydrogen chloride acceptor and a liquid that is less reactive than said tetramer to phosgene, said reaction mass having a pH of between 3.0 and 12.0.

4. The process for the production of nitrogen-containing heterocyclic compounds which comprises reacting phosgene with hydrogen cyanide tetramer in the presence of a hydrogen chloride acceptor and a solvent for said tetramer that is less reactive than said tetramer to phosgene, said reaction mass having a pH of between 3.0 and 12.0.

5. The process for the production of nitrogen-containing heterocyclic compounds which comprises reacting phosgene with hydrogen cyanide tetramer in the presence of a hydrogen chloride acceptor and a solvent for said tetramer that is less reactive than said tetramer to phosgene, said reaction mass having a pH of between 3.0 and 12.0, and hydrolyzing the resulting reaction product.

6. The process for the production of nitrogen-containing heterocyclic compounds which comprises reacting phosgene with hydrogen cyanide tetramer in the presence of a hydrogen chloride acceptor and a solvent for said tetramer that is less reactive than said tetramer to phosgene, said reaction mass having a pH of between 3.0 and 12.0, and hydrolyzing the resulting reaction product with concentrated sulfuric acid.

7. The process for the production of 2-oxo-4,5-imidazolinedicarbonitrile which comprises reacting phosgene with hydrogen cyanide tetramer in the presence of a hydrogen chloride acceptor and a liquid that is less reactive than said tetramer to phosgene, said reaction mass having a pH of between 3.0 and 8.0.

8. The process for the production of 2-oxo-4,5-imidazolinedicarbonamide which comprises reacting phosgene with hydrogen cyanide tetramer in the presence of a hydrogen chloride acceptor and a liquid that is less reactive than said tetramer to phosgene, said reaction mass having a pH of between 3.0 and 8.0, and hydrolyzing the resulting reaction product with concentrated sulfuric acid.

9. 2-oxoimidazolines and their salts, said imidazolines containing, in the 4- and 5-positions, like substituents of the class consisting of cyano and carbonamide groups.

10. 2-oxo-4,5-imidazolinedicarbonitrile and the alkali metal salts thereof.

11. 2-oxo-4,5-imidazolinedicarbonamide and the alkali metal salts thereof.

DAVID W. WOODWARD.

No references cited.

Certificate of Correction

Patent No. 2,534,332 December 19, 1950

DAVID W. WOODWARD

It is hereby certified that error appears in the printed specification of the above numbered patent requiring correction as follows:

Column 2, line 14, for "insomeric" read *isomeric*; column 4, line 62, for "thibutylamine" read *tributylamine*;

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*